T. Gillespie, Jr.
Sorgum-Evaporator.
N° 76074
Patented Mar. 31, 1868.
2 Sheets
Sheet 1.
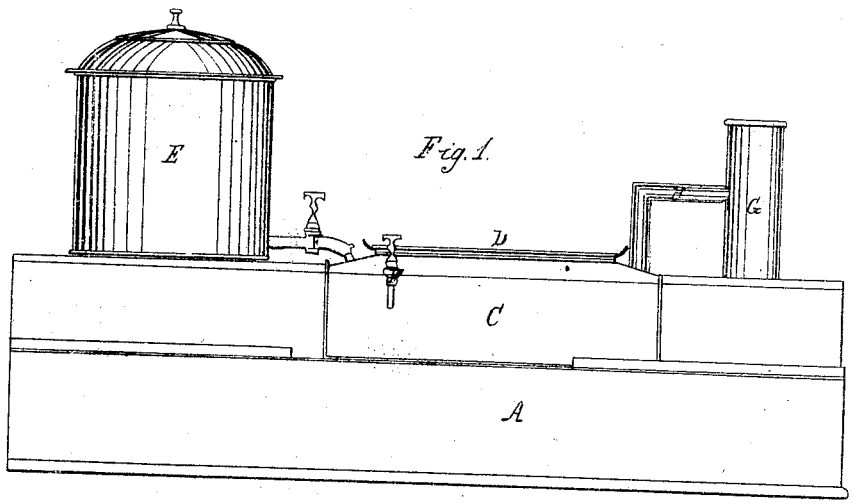
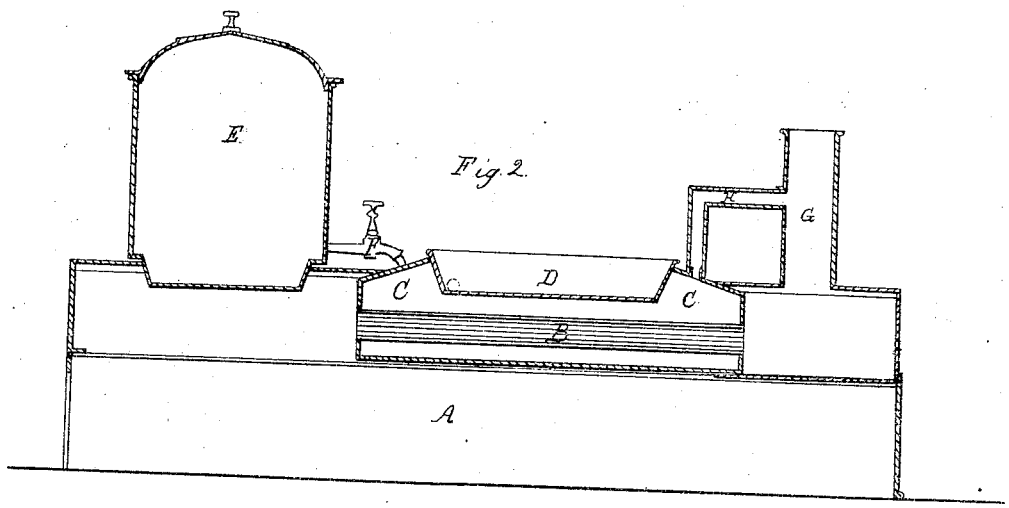
Witnesses
Otto Leifsring
S. F. Parker
Inventor
Thos Gillespie Jr 2 Sheets
Sheet 2
T. Gillespie, Jr.
Sorgum-Evaporator.
Nº 76074  Patented Mar. 31, 1868
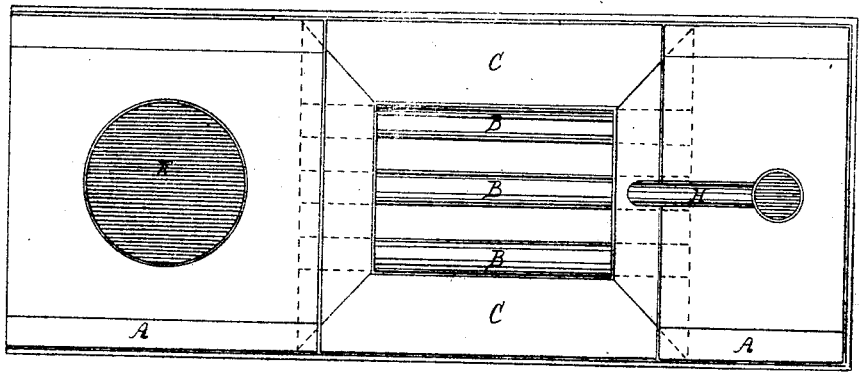
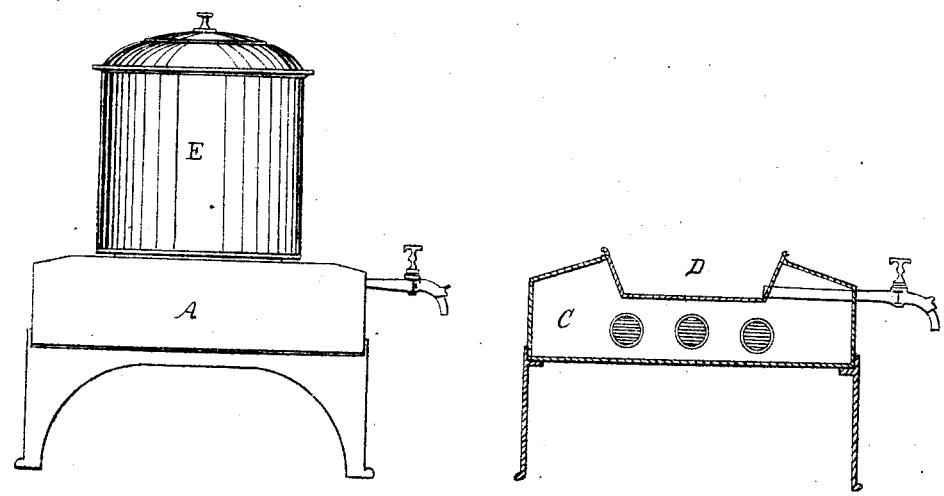
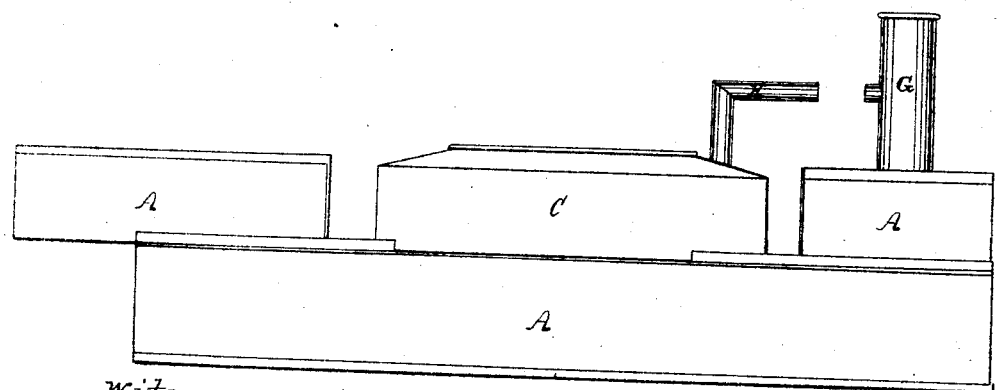
Witnesses
Otto Lefring
S. F. Barker
Inventor
Thos Gillespie Jr

United States Patent Office.

THOMAS GILLESPIE, JR., OF PAULDING COUNTY, OHIO.

Letters Patent No. 76,074, dated March 31, 1868.

IMPROVED SORGHUM-EVAPORATOR.

The Schedule referred to in these Letters Patent and making part of the same.

Be it known that I, THOMAS GILLESPIE, Jr., of Paulding county, in the State of Ohio, have invented a new Machine for Reducing Sorghum and other Sirups; and I do hereby declare that the following is a full, clear, and exact description of the construction and operation of the same.

The nature of my invention consists of the furnace A, by means of which heat is generated and caused to pass through the tubes B, the same passing through the tank C containing water, which is thereby kept at a boiling temperature, over which the pan D, containing the sorghum or other sirup, is placed, and is, by means of the boiling water in the tank C, gradually, and without a possibility of burning, reduced to sirup. The tank C is supplied with water from the reservoir E by means of the gauge-cock F, the stack G, by means of the pipe H, allowing the steam to escape freely, and thereby securing it from all danger of explosion. The cock I is for drawing off the sorghum or other sirups after being reduced.

What I claim as my invention, and desire to secure by Letters Patent, is—

The combination of the furnace A, tubes B, and tank C, substantially as described.

THOMAS GILLESPIE, JR.

Witnesses:
OTTO LEISSRING,
S. F. BAKER.